United States Patent
Feng

(10) Patent No.: US 12,051,379 B2
(45) Date of Patent: Jul. 30, 2024

(54) BRIGHTNESS COMPENSATION METHOD, ELECTRONIC DEVICE, AND COMPUTER-READABLE STORAGE MEDIUM

(71) Applicants: Haining ESWIN IC Design Co., Ltd., Jiaxing (CN); Beijing ESWIN Computing Technology Co., Ltd., Beijing (CN)

(72) Inventor: Guochen Feng, Jiaxing (CN)

(73) Assignees: HAINING ESWIN IC DESIGN CO., LTD., Jiaxing (CN); BEIJING ESWIN COMPUTING TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/147,209

(22) Filed: Dec. 28, 2022

(65) Prior Publication Data

US 2023/0274708 A1 Aug. 31, 2023

(30) Foreign Application Priority Data

Feb. 28, 2022 (CN) .......................... 202210190761.2

(51) Int. Cl.
*G06F 3/038* (2013.01)
*G09G 3/30* (2006.01)
*G09G 3/34* (2006.01)

(52) U.S. Cl.
CPC ..... *G09G 3/3406* (2013.01); *G09G 2320/064* (2013.01)

(58) Field of Classification Search
CPC .................. G09G 2310/08; G09G 2310/061
See application file for complete search history.

(56) References Cited

U.S. PATENT DOCUMENTS

| 6,567,063 B1 | 5/2003 | Okita |
| 2008/0174574 A1* | 7/2008 | Yoo ...................... G09G 3/3233 345/204 |

(Continued)

FOREIGN PATENT DOCUMENTS

| CN | 102568410 A | 7/2012 |
| CN | 106782361 A | 5/2017 |

(Continued)

OTHER PUBLICATIONS

Search Report dated Apr. 12, 2023 from Office Action for Chinese Application No. 2022101907612 issued Apr. 20, 2023. 3 pgs. (see p. 2, categorizing the cited references).

*Primary Examiner* — Nan-Ying Yang
(74) *Attorney, Agent, or Firm* — Ladas & Parry, LLP

(57) ABSTRACT

A brightness compensation method includes steps of: determining a start time of a backlight compensation drive signal of a current frame according to an end time of a standard backlight drive signal of the current frame, and starting transmitting the backlight compensation drive signal to a backlight assembly at the start time of the backlight compensation drive signal; and determining an end time of the backlight compensation drive signal according to a time length of the front porch period of the current frame, and stopping transmitting the backlight compensation drive signal to the backlight assembly at the end time of the backlight compensation drive signal, wherein, the backlight assembly emits light as standard backlight according to the standard backlight drive signal when receiving the standard backlight drive signal, and emits light as compensated backlight according to the backlight compensation drive signal when receiving the backlight compensation drive signal.

15 Claims, 4 Drawing Sheets

(56) References Cited

U.S. PATENT DOCUMENTS

| | | | |
|---|---|---|---|
| 2010/0302268 A1* | 12/2010 | Jun | G09G 5/02 |
| | | | 345/589 |
| 2014/0267464 A1 | 9/2014 | Takamaru et al. | |
| 2016/0293114 A1 | 10/2016 | Hayashi et al. | |
| 2020/0135146 A1 | 4/2020 | Lee et al. | |
| 2020/0175930 A1* | 6/2020 | Koo | G09G 3/3406 |
| 2021/0312876 A1 | 10/2021 | Chen et al. | |

FOREIGN PATENT DOCUMENTS

| | | | |
|---|---|---|---|
| CN | 108806620 A | 11/2018 | |
| CN | 111105758 A | 5/2020 | |
| CN | 111261117 A | 6/2020 | |
| CN | 113096609 A | 7/2021 | |
| WO | 2013069515 A1 | 5/2013 | |
| WO | 2015068791 A1 | 5/2015 | |

* cited by examiner

BRIGHTNESS COMPENSATION METHOD, ELECTRONIC DEVICE, AND COMPUTER-READABLE STORAGE MEDIUM

CROSS-REFERENCE TO RELATED APPLICATION

This application claims priority from Chinese Patent Application No. 202210190761.2 filed on Feb. 28, 2022 in the China National Intellectual Property Office, the content of which in its entirety is herein incorporated by reference.

TECHNICAL FIELD

The present application relates to the technical field of display driving, and in particular to a brightness compensation method, an electronic device, and a computer-readable storage medium.

BACKGROUND

Motion blur is the apparent streaking of rapidly moving an object in a still scene or a sequence of images such as a movie or animation. Blurring occurs when the object moves during the display. This is why it is called motion blur.

The reason for motion blur is that the moving object displayed by the display device is not continuously moving, instead displayed frame by frame, and each frame is maintained statically until the next frame appears. Motion blur occurs at low frame rate.

SUMMARY

In a first aspect, an embodiment of the present application provides a brightness compensation method, suitable for performing brightness compensation on each frame in the freesync mode of a display device, wherein each frame includes a field sync period, a data refresh period and a front porch period. The brightness compensation method includes: determining a start time of a backlight compensation drive signal of a current frame according to an end time of a standard backlight drive signal of the current frame, and starting transmitting the backlight compensation drive signal to a backlight assembly at the start time of the backlight compensation drive signal; and determining an end time of the backlight compensation drive signal according to a time length of the front porch period of the current frame, and stopping transmitting the backlight compensation drive signal to the backlight assembly at the end time of the backlight compensation drive signal; wherein, the backlight assembly emits light as standard backlight according to the standard backlight drive signal when receiving the standard backlight drive signal, and emits light as compensated backlight according to the backlight compensation drive signal when receiving the backlight compensation drive signal.

Optionally, before determining the start time of the backlight compensation drive signal of the current frame according to the end time of the standard backlight drive signal of the current frame, the brightness compensation method further includes: adjusting the end time of the standard backlight drive signal of each frame.

Optionally, the adjusting the end time of the standard backlight drive signal of each frame includes: adjusting a start time of the standard backlight drive signal and a time length of the standard backlight drive signal according to a preset parameter; and determining the end time of the standard backlight drive signal of each frame according to the start time of the standard backlight drive signal and the time length of the standard backlight drive signal.

Optionally, the starting transmitting the backlight compensation drive signal to the backlight assembly at the start time of the backlight compensation drive signal includes: starting transmitting the backlight compensation drive signal with a preset duty cycle to the backlight assembly at the start time of the backlight compensation drive signal, wherein the preset duty cycle is equal to a ratio of a time length of the standard backlight drive signal of a standard frame to a time length of the standard frame, and the standard frame is a frame with the maximum field frequency of the display device in the freesync mode.

Optionally, the determining the end time of the backlight compensation drive signal according to the time length of the front porch period of the current frame includes: determining a difference between the time length of the front porch period of the current frame and the time length of the front porch period of the standard frame as a compensation time length of the backlight compensation drive signal, and determining the time when the compensation time length is elapsed from the start time of the backlight compensation drive signal as the end time of the backlight compensation drive signal.

Optionally, the end time of the standard backlight drive signal is a first preset time or is before the first preset time, the first preset time is in the front porch period of the current frame, and a difference between the first preset time and the start time of the front porch period of the current frame is equal to the time length of the front porch period of the standard frame; and the determining the start time of the backlight compensation drive signal of the current frame according to the end time of the standard backlight drive signal of the current frame includes: using the first preset time as the start time of the backlight compensation drive signal of the current frame.

Optionally, the determining the end time of the backlight compensation drive signal according to the time length of the front porch period of the current frame includes: using a start time of a field sync period of a next frame as the end time of the backlight compensation drive signal.

Optionally, the end time of the standard backlight drive signal is before a first preset time, the first preset time is in the front porch period of the current frame, and a difference between the first preset time and the start time of the front porch period of the current frame is equal to the time length of the front porch period of the standard frame; and the determining the start time of the backlight compensation drive signal of the current frame according to the end time of the standard backlight drive signal of the current frame includes: using a second preset time as the start time of the backlight compensation drive signal of the current frame, wherein the second preset time is after the first preset time, and a difference between the second preset time and the first preset time is greater than 0 and less than the sum of a time length of the field sync period and a time length of the data refresh period.

Optionally, the determining the end time of the backlight compensation drive signal according to the time length of the front porch period of the current frame includes: determining the end time of the backlight compensation drive signal according to the start time of the backlight compensation drive signal and the compensation time length of the backlight compensation drive signal.

In a second aspect, an embodiment of the present application provides an electronic device, including a memory, a processor, and a computer program stored on the memory, wherein the processor executes the computer program to implement steps of the brightness compensation method as described above.

In a third aspect, an embodiment of the present application provides a computer-readable storage medium having a computer program stored thereon that, when executed by a processor, implements steps of the brightness compensation method as described above.

Additional aspects and advantages of the present application will be given in the following description, some of which will become apparent from the following description or appreciated by implementing the present application.

BRIEF DESCRIPTION OF THE DRAWINGS

The above and/or additional aspects and advantages of the present application will become apparent and be readily understood from the following description of embodiments with reference to the accompanying drawings, in which.

DETAILED DESCRIPTION

Figure 1:
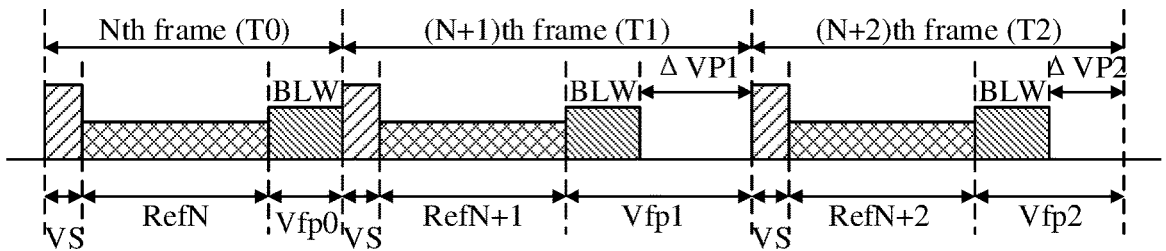
FIG. 1 is a schematic timing diagram of three consecutive frames with different field frequencies in the prior art.

Examples of embodiments of the present application will be illustrated below in the drawings throughout which same or similar reference numerals refer to same or similar elements or elements having same or similar functions. Also, detailed descriptions of known technologies will be omitted if they are not necessary for the illustrated features of the present application. The embodiments described with reference to the drawings are illustrative, merely used for explaining the present application and should not be regarded as any limitations thereto.

It may be understood by those skilled in the art that, unless otherwise defined, all terms (including technical and scientific terms) used herein have the same meaning as commonly understood by a person of ordinary skill in the art to which the present application belongs. It should also be understood that terms, such as those defined in a general dictionary, should be understood to have meanings consistent with their meanings in the context of the prior art and, unless specifically defined as herein, should not be interpreted in idealistic or overly formal meaning.

It should be understood by a person of ordinary skill in the art that singular forms "a", "an", "the", and "said" may be intended to include plural forms as well, unless otherwise stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. As used herein, term "and/or" includes all or any of one or more associated listed items or combinations thereof.

Motion blur is the apparent streaking of rapidly moving an object in a still scene or a sequence of images such as a movie or animation. Blurring occurs when the object moves during the display. This is why it is called motion blur. For example, in some shooting game scenes, the user's perspective changes frequently, and it often happens that the target is aimed but missed. This is caused by motion blur. The user takes the phantom as the target and thus misses it.

The reason for motion blur is that the moving object displayed by the display device are not continuously moving, instead displayed frame by frame, and each frame is maintained statically until the next frame appears. Motion blur occurs at low frame rate.

In order to improve the motion blur, that is, in order to obtain the motion blur reduction, the refresh frequency of the pictures may be increased. However, high refresh frequency will increase energy consumption. For this reason, in the prior art, a freesync model is used. That is, for different demands to display, different refresh frequencies are used. In other words, in the freesync mode, the field frequency of each frame is adjusted according to the detailed displayed image at the frame. Specifically, the field frequency is also called vertical scanning frequency or refresh frequency, which refers to the number of times the screen is refreshed per second, in unit of Hz.

However, the freesync mode is prone to the problem that the display brightness of pictures with different field frequencies is different, which results in flicker. Specifically, FIG. 1 shows a schematic timing diagram of three consecutive frames with different field frequencies in the prior art. As shown in FIG. 1, the three consecutive frames are the Nth frame, the (N+1)th frame, and the (N+2)th frame. Among these three frames, the total width of each frame is not the same, but the BLW (Backlight Width) of each frame is the same, so that the amount of backlight per unit time of each frame is different, resulting in flicker.

Specifically, as shown in FIG. 1, each frame includes a field sync period VS, a data refresh period Ref (including RefN, RefN+1 and RefN+2), and a front porch period Vfp (including Vfp0, Vfp1 and Vfp2). The field sync period is used to transmit the field sync signal, and the function of the field sync signal (VS) is to select the effective field signal interval of the display panel; the data refresh period is used to write data signals to the display panel; and the liquid crystal molecules in the front porch period hold the yaw angle of the current frame.

The front porch period Vfp0 of the Nth display picture shown in FIG. 1 is the minimum front porch period Min Vfp. The difference between the front porch period Vfp1 of the (N+1)th display picture and the minimum front porch period Min Vfp is ΔVfp1, and the difference between the front porch period Vfp2 of the (N+2)th display picture and the minimum front porch period Min Vfp is ΔVfp2. It may be found that the total width of each frame from the Nth frame to the (N+2)th frame is not the same.

The present application provides a brightness compensation method, an electronic device, and a computer-readable storage medium, which may solve the above technical problems at least.

The technical solutions of the present application and how to solve the above technical problems by the technical solutions of the present application will be described below by specific embodiments in detail.

Figure 2:
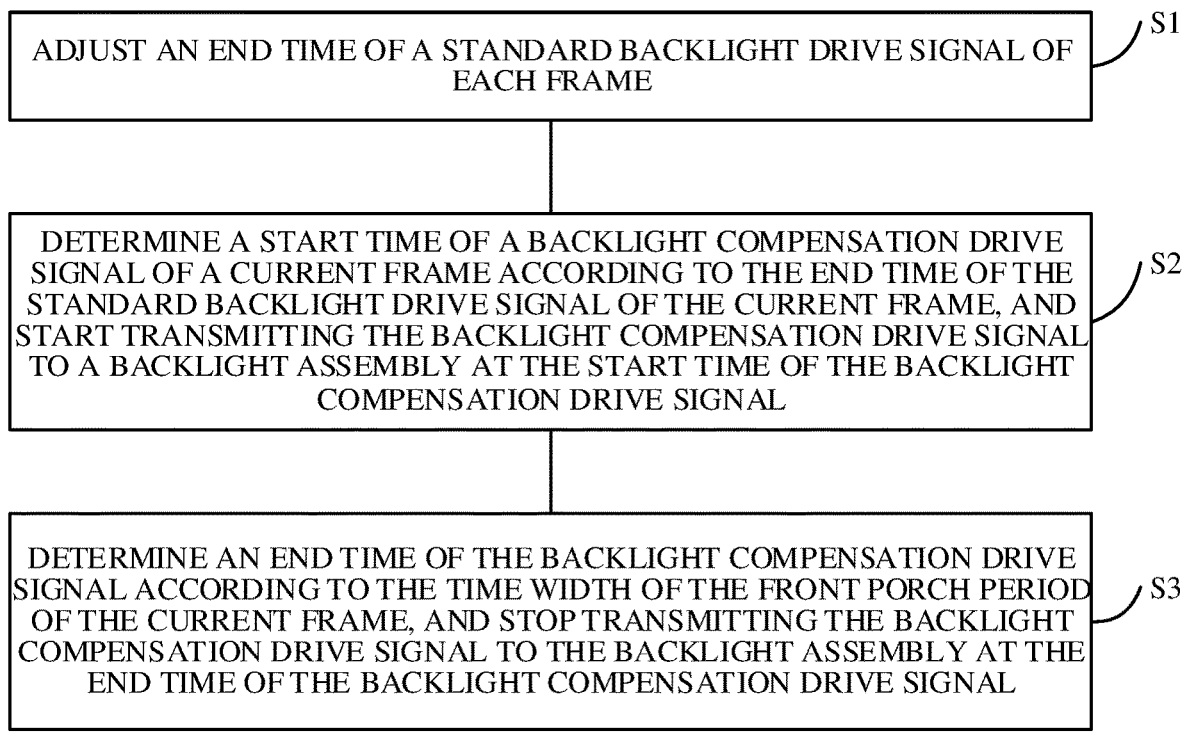
FIG. 2 is a schematic flowchart of a brightness compensation method according to an embodiment of the present application.
Figure 3:
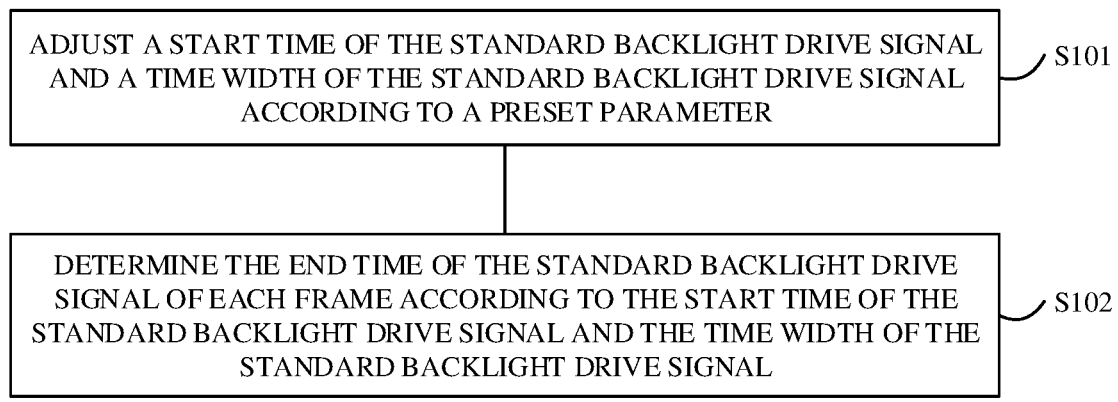
FIG. 3 is a schematic flowchart of step S1 in the brightness compensation method of FIG. 2.

FIG. 2 is a schematic flowchart of a brightness compensation method according to an embodiment of the present application. FIG. 3 is a schematic flowchart of step S1 in the brightness compensation method of FIG. 2.

An embodiment of the present application provides a brightness compensation method, suitable for performing brightness compensation on each frame in the freesync mode of a display device, wherein each frame includes a field sync period, a data refresh period and a front porch period.

As shown in FIG. 2 and FIG. 3, the brightness compensation method in this embodiment includes steps S1 to S3.

S1: An end time of a standard backlight drive signal of each frame is adjusted.

Specifically, as shown in FIG. 3, in the brightness compensation method in this embodiment, the step S1 includes steps S101 to S102.

S101: A start time of the standard backlight drive signal and a time length of the standard backlight drive signal are adjusted according to a preset parameter.

S102: The end time of the standard backlight drive signal of each frame is determined according to the start time of the standard backlight drive signal and the time length of the standard backlight drive signal.

S2: A start time of a backlight compensation drive signal of a current frame is determined according to the end time of the standard backlight drive signal of the current frame, and transmission of the backlight compensation drive signal to a backlight assembly is started at the start time of the backlight compensation drive signal.

S3: An end time of the backlight compensation drive signal is determined according to the time length of the front porch period of the current frame, and transmission of the backlight compensation drive signal to the backlight assembly is stopped at the end time of the backlight compensation drive signal.

The backlight assembly emits light as standard backlight according to the standard backlight drive signal when receiving the standard backlight drive signal, and emits light as compensated backlight according to the backlight compensation drive signal when receiving the backlight compensation drive signal.

Specifically, the backlight assembly includes a light bar, an optical film, etc., wherein the light bar includes a circuit board and a plurality of light emitting units fixed on the circuit board, for example, a plurality of light emitting diodes (LEDs). The standard backlight drive signal enables the light bar of the backlight assembly to emit light in a standard time length.

It should be noted that, in some optional embodiments, when adjusting the brightness, it is usually necessary to adjust the time length of the standard backlight drive signal, and the end time of the standard backlight drive signal may be adjusted accordingly. In this case, the step S1 needs to be performed. However, in other optional embodiments, when adjusting the brightness, it is usually necessary to adjust the time length of the standard backlight drive signal, but the end time of the standard backlight drive signal may not be adjusted. In this case, the step S1 does not need to be performed. In still other optional embodiments, it is also not necessary to adjust the brightness, so that the end time of the standard backlight drive signal also does not need to be adjusted. In this case, the step S1 also does not need to be performed.

With the brightness compensation method in the embodiment, the backlight compensation is realized by determining the start time and end time of the backlight compensation drive signal of the current frame, and enabling the backlight assembly to emit light according to the backlight compensation drive signal between the start time and the end time. Thus, the brightness of frames is consistent, which may improve the display flickering caused by the motion blur in the free synchronization mode and improve the display effect.

Figure 4:
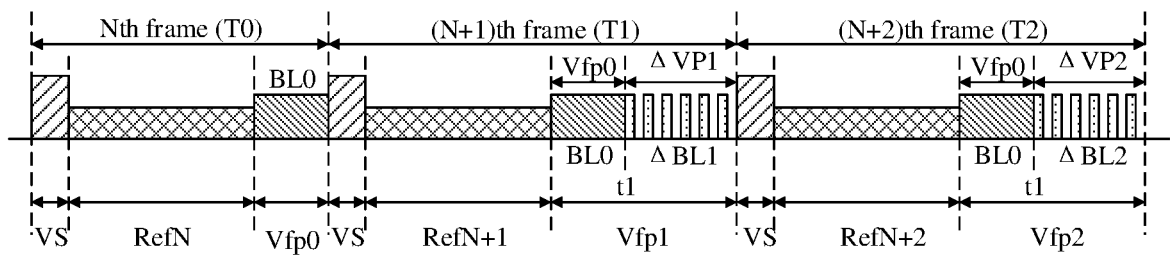
FIG. 4 is a timing diagram of three consecutive frames according to an embodiment of the present application.
Figure 5:
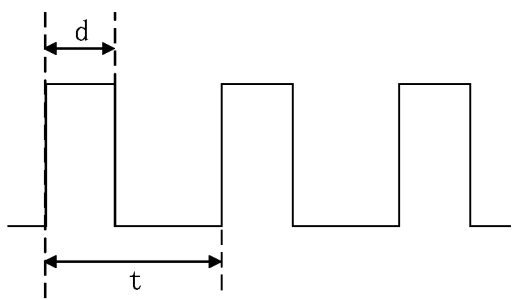
FIG. 5 is a schematic diagram of a backlight compensation drive signal according to an embodiment of the present application.

FIG. 4 is a timing diagram of three consecutive frames according to an embodiment of the present application. FIG. 5 is a schematic diagram of a backlight compensation drive signal according to an embodiment of the present application.

Optionally, as shown in FIG. 4 and FIG. 5, in the brightness compensation method in this embodiment, the step S2 includes: starting transmitting the backlight compensation drive signal with a preset duty cycle to the backlight assembly at the start time, wherein the preset duty cycle is equal to the ratio of the time length of the standard backlight drive signal of a standard frame to the time length of the standard frame, and the standard frame is a frame with the maximum field frequency of the display device in the freesync mode.

Optionally, as shown in FIG. 4 and FIG. 5, in the brightness compensation method in this embodiment, the step S3 includes: determining the difference between the time length of the front porch period of the current frame and the time length of the front porch period of the standard frame as the compensation time length, and determining the time when the compensation time length is elapsed from the start time of the backlight compensation drive signal as the end time of the backlight compensation drive signal.

Specifically, as shown in FIG. 4, provided are the Nth frame, the (N+1)th frame, and the (N+2)th frame, wherein the (N+1)th frame is used as the current frame. The time length of each frame includes the time length of the field sync period VS, the time length of the data refresh period Ref (e.g., RefN, RefN+1, and RefN+2), and the time length of the front porch period Vfp (e.g., Vfp0, Vfp1, and Vfp2).

Specifically, as shown in FIG. 4 and FIG. 5, in the present application, the preset duty cycle d/t is equal to the ratio of the time length of the standard backlight drive signal of the standard frame to the time length of the standard frame. The standard frame is a frame with the maximum field frequency of the display device in the freesync mode. The time length of the front porch period of the standard frame is equal to the time length of the standard backlight drive signal. For example, the Nth frame in FIG. 4 is the standard frame, and the time length Vfp0 of the front porch period in the Nth frame is the minimum time length Vfp of the front porch period. In the special case shown in FIG. 3, the time length Vfp0 of the front porch period of the standard frame is equal to the time length of the standard backlight drive signal BL0.

It should be noted that the time length Vfp0 of the front porch period of the standard frame may not be equal to the time length of the standard backlight drive signal BL0, which needs to be determined according to the current display brightness. The time length of the standard backlight drive signal BL0 corresponding to different display brightness varies.

It should be noted that the detailed range of the field frequency is restricted by the hardware, and the field frequency range in the freesync mode in different display devices is different.

For example, in a display device, the field frequency in the freesync mode ranges from 30 Hz to 240 Hz, wherein the standard frame is a frame with a field frequency of 240 Hz, and the time length of the standard frame is 1 s/240 Hz. For example, in another display device, the field frequency in the freesync mode ranges from 10 Hz to 280 Hz, wherein the standard frame is a frame with a field frequency of 280 Hz, and the time length of the standard frame is 1 s/280 Hz. Of course, the field frequency range is exemplary, and the detailed field frequency range of the display device may be other values.

Specifically, as shown in FIG. 4 and FIG. 5, the ratio of the total light emitting time length of the backlight assembly of the current frame (the (N+1)th frame) to the total time length of the current frame is $W/T_1$, where $W=Vfp0+\Delta VP1*(d/t)$, and the standard duty cycle $d/t=Vfp0/T_0$. Then:

$$\frac{W}{T_1} = \frac{Vfp_0 + \frac{Vfp_0*(T_1\ T_0)}{T_0}}{T_1}$$
$$= \frac{Vfp_0*T_0 + Vfp_0*(T_1-T_0)}{T_1 T_0}$$
$$= \frac{Vfp_0}{T_1} + \frac{Vfpo}{T_0} - \frac{Vfp_0}{T_1}$$
$$= \frac{Vfp_0}{T_0}$$

Figure 6:
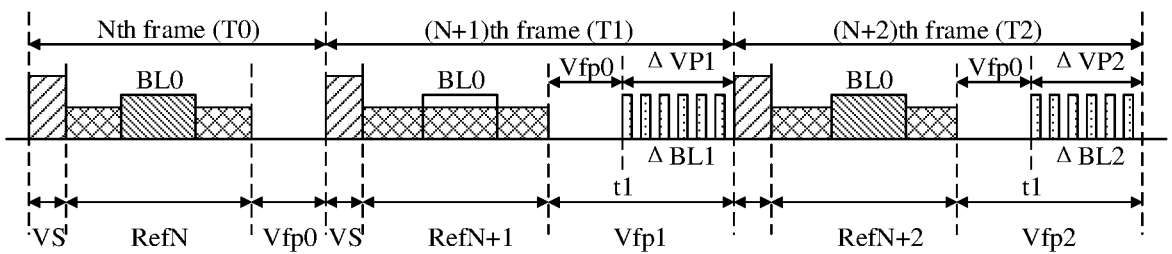
FIG. 6 is another timing diagram of three consecutive frames according to an embodiment of the present application.
Figure 7:
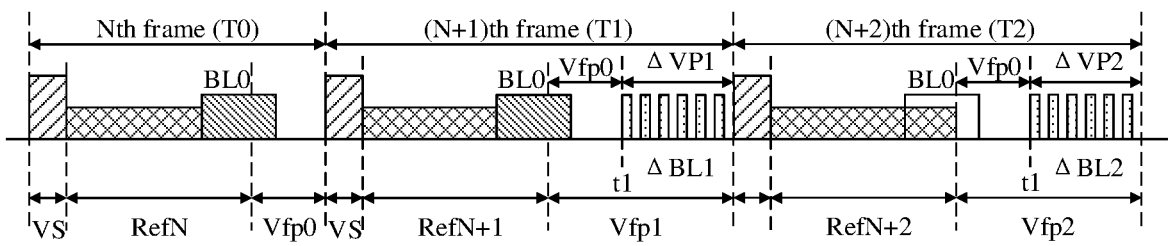
FIG. 7 is still another timing diagram of three consecutive frames according to an embodiment of the present application.
Figure 8:
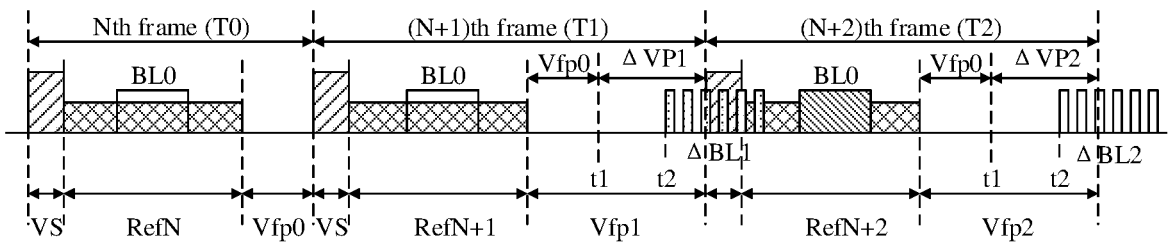
FIG. 8 is yet another timing diagram of three consecutive frames according to an embodiment of the present application.

FIG. 6 is another timing diagram of three consecutive frames according to an embodiment of the present application. FIG. 7 is still another timing diagram of three consecutive frames according to an embodiment of the present application. FIG. 8 is yet another timing diagram of three consecutive frames according to an embodiment of the present application.

Optionally, as shown in FIG. 4 and FIG. 6 to FIG. 8, in the brightness compensation method in this embodiment, the end time of the standard backlight drive signal is a first preset time or is before the first preset time. The first preset time is in the front porch period of the current frame, and the difference between the first preset time and the start time of the front porch period is equal to the time length of the front porch period of the standard frame.

It should be noted that, as shown in FIG. 4 and FIG. 6 to FIG. 8, the first preset time in the standard frame is the end time of the front porch period of the standard frame. Therefore, letting the end time of the standard backlight drive signal be the first preset time or before the first preset time may ensure the standard backlight drive signal of any frame is within the time length of this frame.

Specifically, as shown in FIG. 4, the start time of the standard backlight drive signal BL0 is in the front porch period, that is, the standard backlight drive signal BL0 is in the front porch period. As shown in FIG. 6 and FIG. 8, the end time of the standard backlight drive signal BL0 is in the data refresh period, that is, the standard backlight drive signal BL0 is in the data refresh period. As shown in FIG. 7, the end time of the standard backlight drive signal BL0 is in the front porch period and the start time of the standard backlight drive signal is in the data refresh period, that is, the standard backlight drive signal BL0 is partly in the data refresh period and partly in the front porch period.

On this basis, different methods may be used for the step S2 and the step S3 in the brightness compensation method in this embodiment, which will be described in detail below.

In an optional embodiment, as shown in FIG. 4, FIG. 6, and FIG. 7, in the brightness compensation method in this embodiment, the step S2 includes: using the first preset time as the start time of the backlight compensation drive signal of the current frame.

Based on the step S2 in this embodiment of using the first preset time as the start time of the backlight compensation drive signal of the current frame, in the brightness compensation method in this embodiment, the step S3 includes: using the start time of a field sync period of a next frame as the end time of the backlight compensation drive signal.

Since the difference between the first preset time and the start time of the front porch period is equal to the time length of the front porch period of the standard frame, the first preset time is used as the start time of the backlight compensation drive signal of the current frame, then the time length from the first preset time to the start time of the field sync period of the next frame just is the compensation time length of the backlight compensation drive signal the current frame, that is, the start time of the field sync period of the next frame is the end time of the backlight compensation drive signal of the current frame. The backlight compensation method in this embodiment is simple and convenient, and the compensation effect is good.

In another optional embodiment, as shown in FIG. 8, in the brightness compensation method in this embodiment, the step S2 includes: using a second preset time as the start time of the backlight compensation drive signal $\Delta BL1$ of the current frame, wherein the second preset time is after the first preset time, and the difference between the second preset time and the first preset time is greater than 0 and is less than the sum of the time length of the field sync period VS and the time length of the data refresh period Ref.

It should be noted that although the standard backlight drive signal BL0 in the timing diagram shown in FIG. 8 is in the data refresh period, in the brightness compensation method in this embodiment, the standard backlight drive signal BL0 may be in the front porch period, alternatively the standard backlight drive signal BL0 may also be partly in the data refresh period and partly in the front porch period.

Specifically, as shown in FIG. 8, the difference between the second preset time t2 and the first preset time t1 is $\Delta t$. Since the second preset time t2 is after the first preset time t1, $\Delta t>0$. Assuming that the first preset time t1 of the current frame ((N+1)th frame) is 0, the start time of the front porch period of the next frame ((N+2)th frame) is $\Delta VP1+VS+RefN+2$. In order to ensure the normal operation of the backlight assembly, it should be ensured that $\Delta BL1$ is between the end time of the BL0 of the current frame ((N+1)th frame) and the start time of the BL0 of the next frame ((N+2)th frame).

As shown in FIG. 8, the end time of the backlight compensation drive signal $\Delta BL1$ is $\Delta t+\Delta VP1$, and $\Delta t+\Delta VP1<\Delta VP1+VS+RefN+2$, that is, $\Delta t<VS+RefN+2$. Therefore, it may be determined that the value of $\Delta t$ is greater than 0 and less than the sum of the time length of the field sync period and the time length of the data refresh period.

Based on the step S2 in this embodiment of using a second preset time as the start time of the backlight compensation drive signal of the current frame, in the brightness compensation method in this embodiment, the step S3 includes: determining the end time of the backlight compensation drive signal according to the start time of the backlight compensation drive signal and the compensation time length.

Specifically, in this embodiment, the time length of the current frame needs to be determined in a statistical manner to determine the time length of the front porch period of the current frame, and the difference between the time length of this front porch period and the time length of the front porch period of the standard frame is used as the compensation time length to determine the end time of the backlight compensation drive signal.

It should be noted that, although part of the backlight compensation drive signal of the current frame is in the next frame, during the display process, part of the backlight compensation drive signal of the current frame is in the next frame and part of the backlight compensation drive signal of the previous frame is also in the current frame. Therefore, brightness compensation is realized.

In embodiments of the present application, parameters such as the preset parameter, the preset duty ratio, the first preset time, the second preset time, or the like may be predetermined or set according to standard in the art when the display device is fabricated by manufacturer, and are not limited herein.

Based on the same inventive concept, an embodiment of the present application provides an electronic device, including a memory, a processor, and a computer program stored on the memory, wherein the processor executes the computer program to implement steps of the brightness compensation method in the above embodiments. The electronic device has the beneficial effects of the brightness compensation method, which will not be repeated here.

Figure 9:
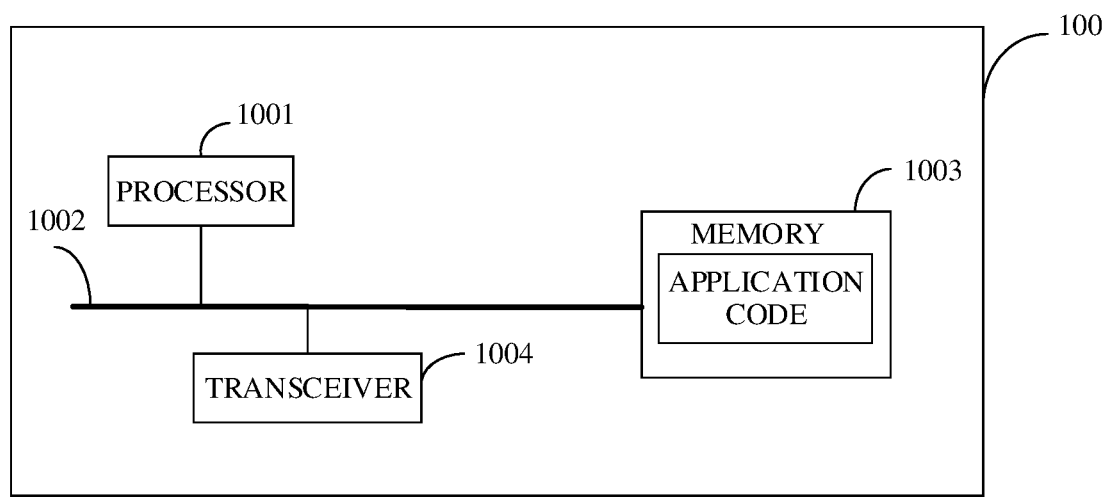
FIG. 9 is a schematic structure diagram of the architecture of an electronic device according to an embodiment of the present application.

FIG. 9 is a schematic structure diagram of the architecture of an electronic device according to an embodiment of the present application. As shown, in an optional embodiment, the electronic device 100 shown in FIG. 9 includes a processor 1001 and a memory 1003. The processor 1001 is connected to the memory 1003, for example, through a bus 1002. Optionally, the electronic device 100 may further include a transceiver 1004, which may be used for data interaction between the electronic device and other electronic device, for example, data transmission and/or data reception. It should be noted that, in practical applications, the transceiver 1004 is not limited to one, and the structure of the electronic device 100 does not constitute any limitations to the embodiments of the present application.

The processor 1001 may be a central processing unit (CPU), a general-purpose processor, a digital signal processor (DSP), an application specific integrated circuit (ASIC), or a field programmable gate array (FPGA), or other programmable logic device, transistor logic device, hardware component, or any combination thereof. It may implement or execute various exemplary logical blocks, modules and circuits described in connection with the present disclosure. The processor 1001 may also be a combination for realizing computing functions, for example, a combination of one or more microprocessors, a combination of a DSP and a microprocessor, etc.

The bus 1002 may include a path to transfer information between the components described above. The bus 1002 may be a peripheral component interconnect (PCI) bus, or an extended industry standard architecture (EISA) bus, etc. The bus 1002 may be an address bus, a data bus, a control bus, etc. For ease of presentation, the bus is represented by only one thick line in FIG. 9. However, it does not mean that there is only one bus or one type of buses.

The memory 1003 may be, but is not limited to, read only memory (ROM) or other type of static storage device that may store static information and instructions, random access memory (RAM) or other type of dynamic storage device that may store information and instructions, may be electrically erasable programmable read only memory (EEPROM), compact disc read only memory (CD-ROM) or other optical disk storage, optical disc storage (including compact disc, laser disc, disc, digital versatile disc, blue-ray disc, etc.), magnetic storage media or other magnetic storage device, or any other media that may carry or store desired programs and that may be accessed by a computer.

The memory 1003 is used to store application programs for executing the embodiments of the present application, and is controlled by the processor 1001. The processor 1001 is used to execute the application programs stored in the memory 1003 to implement the steps of the foregoing method embodiments.

In an embodiment of the present application, an electronic device including a display panel and a processor is provided. The processor is configured to: determine a start time of a backlight compensation drive signal of a current frame of the display panel according to an end time of a standard backlight drive signal of the current frame, and start transmitting the backlight compensation drive signal to a backlight assembly of the display panel at the start time of the backlight compensation drive signal; and determine an end time of the backlight compensation drive signal according to a time length of the front porch period of the current frame, and stop transmitting the backlight compensation drive signal to the backlight assembly at the end time of the backlight compensation drive signal; wherein, the backlight assembly emits light as standard backlight according to the standard backlight drive signal when receiving the standard backlight drive signal, and emits light as compensated backlight according to the backlight compensation drive signal when receiving the backlight compensation drive signal.

In an embodiment of the present application, before determining the start time of the backlight compensation drive signal of the current frame according to the end time of the standard backlight drive signal of the current frame, the processor is further configured to: adjust the end time of the standard backlight drive signal of each frame.

In an embodiment of the present application, wherein the processor is further configured to: adjust a start time of the standard backlight drive signal and a time length of the standard backlight drive signal according to a preset parameter; and determine the end time of the standard backlight drive signal of each frame according to the start time of the standard backlight drive signal and the time length of the standard backlight drive signal.

In an embodiment of the present application, the processor is further configured to: start transmitting the backlight compensation drive signal with a preset duty cycle to the backlight assembly at the start time of the backlight compensation drive signal, wherein the preset duty cycle is equal to a ratio of a time length of the standard backlight drive signal of a standard frame to a time length of the standard frame, and the standard frame is a frame with the maximum field frequency of the display panel in the freesync mode.

In an embodiment of the present application, the processor is further configured to: determine a difference between the time length of the front porch period of the current frame and the time length of the front porch period of the standard frame as a compensation time length of the backlight compensation drive signal, and determine the time when the compensation time length is elapsed from the start time of the backlight compensation drive signal as the end time of the backlight compensation drive signal.

In an embodiment of the present application, the end time of the standard backlight drive signal is a first preset time or is before the first preset time, the first preset time is in the front porch period of the current frame, and a difference between the first preset time and the start time of the front porch period of the current frame is equal to the time length of the front porch period of the standard frame. The processor is further configured to: use the first preset time as the start time of the backlight compensation drive signal of the current frame.

In an embodiment of the present application, the processor is further configured to use a start time of a field sync period of a next frame as the end time of the backlight compensation drive signal.

In an embodiment of the present application, the end time of the standard backlight drive signal is before a first preset time, the first preset time is in the front porch period of the current frame, and a difference between the first preset time and the start time of the front porch period of the current frame is equal to the time length of the front porch period of the standard frame. The processor is further configured to use a second preset time as the start time of the backlight compensation drive signal of the current frame, wherein the second preset time is after the first preset time, and a difference between the second preset time and the first preset time is greater than 0 and less than the sum of a time length of the field sync period of the current frame and a time length of the data refresh period of the current frame.

In an embodiment of the present application, the processor is further configured to determine the end time of the backlight compensation drive signal according to the start time of the backlight compensation drive signal and the compensation time length of the backlight compensation drive signal.

Based on the same inventive concept, an embodiment of the present application provides a computer-readable storage medium having a computer program stored thereon that, when executed by a processor, implements steps and corresponding contents of the brightness compensation method in the above embodiments. The computer-readable storage medium has the beneficial effects of the brightness compensation method in the above embodiments, which will not be repeated here.

The application of the embodiments of the present invention at least has the following beneficial effects.

With the brightness compensation method, electronic device, and computer-readable storage medium in the embodiment, the backlight compensation is realized by determining the start time and end time of the backlight compensation drive signal of the current frame, and enabling the backlight assembly to emit light according to the backlight compensation drive signal between the start time and the end time. Thus, the brightness of frames is consistent, which may improve the display flickering caused by the motion blur in the freesync mode and improve the display effect.

It may be understood by a person of ordinary skill in the art that steps, measures and solutions in the operations, methods, and flows already discussed in the present application may be alternated, changed, combined or deleted. Further, other steps, measures and solutions in the operations, methods, and flows already discussed in the present application may also be alternated, changed, rearranged, decomposed, combined or deleted. Further, prior arts having steps, measures and solutions in the operations, methods, and flows already discussed in the present invention may also be alternated, changed, rearranged, decomposed, combined or deleted.

The terms "first" and "second" are simply used for the purpose of description, and should not be regarded as indicating or implying relative importance or implicitly indicating the number of indicated technical features. Therefore, the features defined by "first" and "second" may explicitly or implicitly include one or more of the features. In the description of the present invention, unless specifically stated otherwise, "a plurality of" means "two" or "more than two".

It should be understood that although the steps in the flowchart shown in the drawings are sequentially displayed by following the arrows, these steps are not necessarily performed in the order indicated by the arrows. Unless explicitly stated herein, the execution order of these steps is not strictly limited, and they may be performed in other orders. Moreover, at least some of the steps in the flowcharts shown in the drawings may include multiple sub-steps or multiple stages. These sub-steps or stages are not necessarily performed at the same moment of time, and instead, may be performed at different moments of time. The sub-steps or stages are not necessarily performed sequentially, and instead, may be performed in turn or alternately with other steps or at least some of the sub-steps or stages of other steps. For example, the step S1 is performed in some embodiments and is not performed in other embodiments.

The foregoing descriptions are merely some implementations of the present application. It should be noted that, to a person of ordinary skill in the art, various improvements and modifications may be made without departing from the principle of the present application, and these improvements and modifications shall be deemed as falling into the protection scope of the present application.

What is claimed is:

1. A brightness compensation method, suitable for performing brightness compensation on each frame in the freesync mode of a display device, wherein each frame comprises a field sync period, a data refresh period and a front porch period, wherein the brightness compensation method comprises:
   determining a start time of a backlight compensation drive signal of a current frame according to an end time of a standard backlight drive signal of the current frame, and starting transmitting the backlight compensation drive signal to a backlight assembly at the start time of the backlight compensation drive signal; and
   determining an end time of the backlight compensation drive signal according to a time length of the front porch period of the current frame, and stopping transmitting the backlight compensation drive signal to the backlight assembly at the end time of the backlight compensation drive signal;
   wherein, the backlight assembly emits light as standard backlight according to the standard backlight drive signal when receiving the standard backlight drive signal, and emits light as compensated backlight according to the backlight compensation drive signal when receiving the backlight compensation drive signal,
   wherein, the starting transmitting the backlight compensation drive signal to the backlight assembly at the start time of the backlight compensation drive signal comprises: starting transmitting the backlight compensation drive signal with a preset duty cycle to the backlight assembly at the start time of the backlight compensation drive signal, wherein the preset duty cycle is equal to a ratio of a time length of the standard backlight drive signal of a standard frame to a time length of the standard frame, and the standard frame is a frame with the maximum field frequency of the display device in the freesync mode, and wherein the determining the end time of the backlight compensation drive signal according to the time length of the front porch period of the current frame comprises determining a difference between the time length of the front porch period of the current frame and the time length of the front porch period of the standard frame as a compensation time length of the backlight compensation drive signal, and determining the time when the compensation time length is elapsed from the start time of the backlight compensation drive signal as the end time of the backlight compensation drive signal.

2. The brightness compensation method according to claim 1, before determining the start time of the backlight compensation drive signal of the current frame according to the end time of the standard backlight drive signal of the current frame, further comprising:

adjusting the end time of the standard backlight drive signal of each frame.

3. The brightness compensation method according to claim 2, wherein the adjusting the end time of the standard backlight drive signal of each frame comprises:

adjusting a start time of the standard backlight drive signal and a time length of the standard backlight drive signal according to a preset parameter; and determining the end time of the standard backlight drive signal of each frame according to the start time of the standard backlight drive signal and the time length of the standard backlight drive signal.

4. The brightness compensation method according to claim 1, wherein the end time of the standard backlight drive signal is a first preset time or is before the first preset time, the first preset time is in the front porch period of the current frame, and a difference between the first preset time and the start time of the front porch period of the current frame is equal to the time length of the front porch period of the standard frame; and the determining the start time of the backlight compensation drive signal of the current frame according to the end time of the standard backlight drive signal of the current frame comprises:

using the first preset time as the start time of the backlight compensation drive signal of the current frame.

5. The brightness compensation method according to claim 4, wherein the determining the end time of the backlight compensation drive signal according to the time length of the front porch period of the current frame comprises:

using a start time of a field sync period of a next frame as the end time of the backlight compensation drive signal.

6. The brightness compensation method according to claim 1, wherein the end time of the standard backlight drive signal is before a first preset time, the first preset time is in the front porch period of the current frame, and a difference between the first preset time and the start time of the front porch period of the current frame is equal to the time length of the front porch period of the standard frame; and the determining the start time of the backlight compensation drive signal of the current frame according to the end time of the standard backlight drive signal of the current frame comprises:

using a second preset time as the start time of the backlight compensation drive signal of the current frame, wherein the second preset time is after the first preset time, and a difference between the second preset time and the first preset time is greater than 0 and less than the sum of a time length of the field sync period of the current frame and a time length of the data refresh period of the current frame.

7. The brightness compensation method according to claim 6, wherein the determining the end time of the backlight compensation drive signal according to the time length of the front porch period of the current frame comprises:

determining the end time of the backlight compensation drive signal according to the start time of the backlight compensation drive signal and the compensation time length of the backlight compensation drive signal.

8. An electronic device, comprising a display panel and a processor, wherein the processor is configured to:

determine a start time of a backlight compensation drive signal of a current frame of the display panel according to an end time of a standard backlight drive signal of the current frame, and start transmitting the backlight compensation drive signal to a backlight assembly of the display panel at the start time of the backlight compensation drive signal; and determine an end time of the backlight compensation drive signal according to a time length of the front porch period of the current frame, and stop transmitting the backlight compensation drive signal to the backlight assembly at the end time of the backlight compensation drive signal;

wherein, the backlight assembly emits light as standard backlight according to the standard backlight drive signal when receiving the standard backlight drive signal, and emits light as compensated backlight according to the backlight compensation drive signal when receiving the backlight compensation drive signal, wherein, the processor is further configured to: starting transmitting the backlight compensation drive signal with a preset duty cycle to the backlight assembly at the start time of the backlight compensation drive signal, wherein the preset duty cycle is equal to a ratio of a time length of the standard backlight drive signal of a standard frame to a time length of the standard frame, and the standard frame is a frame with the maximum field frequency of the display device in the freesync mode, and wherein the processor is further configured to: determining a difference between the time length of the front porch period of the current frame and the time length of the front porch period of the standard frame as a compensation time length of the backlight compensation drive signal, and determining the time when the compensation time length is elapsed from the start time of the backlight compensation drive signal as the end time of the backlight compensation drive signal.

9. The electronic device according to claim 8, before determining the start time of the backlight compensation drive signal of the current frame according to the end time of the standard backlight drive signal of the current frame, the processor is further configured to: adjust the end time of the standard backlight drive signal of each frame.

10. The electronic device according to claim 9, wherein the processor is further configured to:
adjust a start time of the standard backlight drive signal and a time length of the standard backlight drive signal according to a preset parameter; and
determine the end time of the standard backlight drive signal of each frame according to the start time of the standard backlight drive signal and the time length of the standard backlight drive signal.

11. The electronic device according to claim 8, wherein the end time of the standard backlight drive signal is a first preset time or is before the first preset time, the first preset time is in the front porch period of the current frame, and a difference between the first preset time and the start time of the front porch period of the current frame is equal to the time length of the front porch period of the standard frame; and
the processor is further configured to: use the first preset time as the start time of the backlight compensation drive signal of the current frame.

12. The electronic device according to claim 11, wherein the processor is further configured to: use a start time of a field sync period of a next frame as the end time of the backlight compensation drive signal.

13. The electronic device according to claim 8, wherein the end time of the standard backlight drive signal is before a first preset time, the first preset time is in the front porch period of the current frame, and a difference between the first preset time and the start time of the front porch period of the current frame is equal to the time length of the front porch period of the standard frame; and
the processor is further configured to:
use a second preset time as the start time of the backlight compensation drive signal of the current frame, wherein the second preset time is after the first preset time, and a difference between the second preset time and the first preset time is greater than 0 and less than the sum of a time length of the field sync period of the current frame and a time length of the data refresh period of the current frame.

14. The electronic device according to claim 13, wherein the processor is further configured to:
determine the end time of the backlight compensation drive signal according to the start time of the backlight compensation drive signal and the compensation time length of the backlight compensation drive signal.

15. A non-transitory computer-readable storage medium having a computer program stored thereon that, when executed by a processor, implements steps of:
determining a start time of a backlight compensation drive signal of a current frame of a display device according to an end time of a standard backlight drive signal of the current frame, and starting transmitting the backlight compensation drive signal to a backlight assembly of the display device at the start time of the backlight compensation drive signal; and
determining an end time of the backlight compensation drive signal according to a time length of the front porch period of the current frame, and stopping transmitting the backlight compensation drive signal to the backlight assembly at the end time of the backlight compensation drive signal;
wherein, the backlight assembly emits light as standard backlight according to the standard backlight drive signal when receiving the standard backlight drive signal, and emits light as compensated backlight according to the backlight compensation drive signal when receiving the backlight compensation drive signal,
wherein, the starting transmitting the backlight compensation drive signal to the backlight assembly at the start time of the backlight compensation drive signal comprises: starting transmitting the backlight compensation drive signal with a preset duty cycle to the backlight assembly at the start time of the backlight compensation drive signal, wherein the preset duty cycle is equal to a ratio of a time length of the standard backlight drive signal of a standard frame to a time length of the standard frame, and the standard frame is a frame with the maximum field frequency of the display device in the freesync mode, and
wherein the determining the end time of the backlight compensation drive signal according to the time length of the front porch period of the current frame comprises determining a difference between the time length of the front porch period of the current frame and the time length of the front porch period of the standard frame as a compensation time length of the backlight compensation drive signal, and determining the time when the compensation time length is elapsed from the start time of the backlight compensation drive signal as the end time of the backlight compensation drive signal.

* * * * *